No. 756,868. PATENTED APR. 12, 1904.
A. K. MANSFIELD.
VALVE FOR BLOWING ENGINES AND AIR COMPRESSORS.
APPLICATION FILED JAN. 5, 1903.
NO MODEL. 2 SHEETS—SHEET 1.
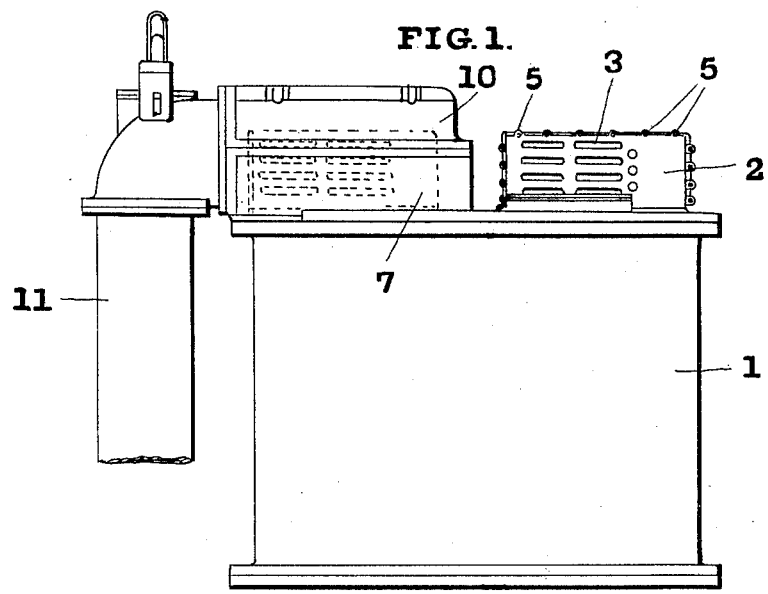
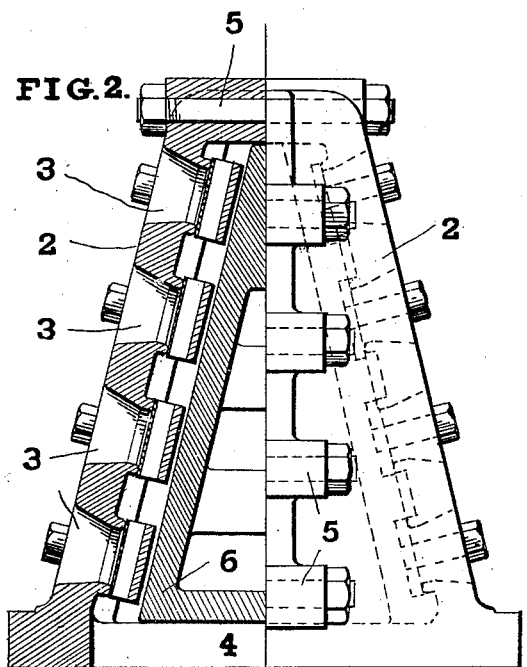
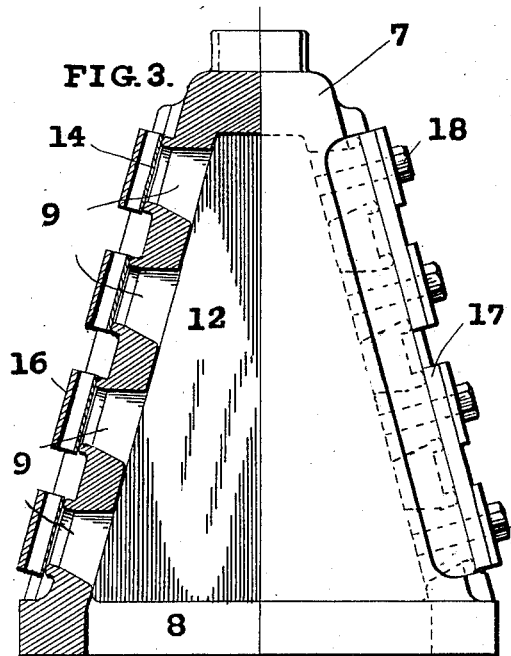

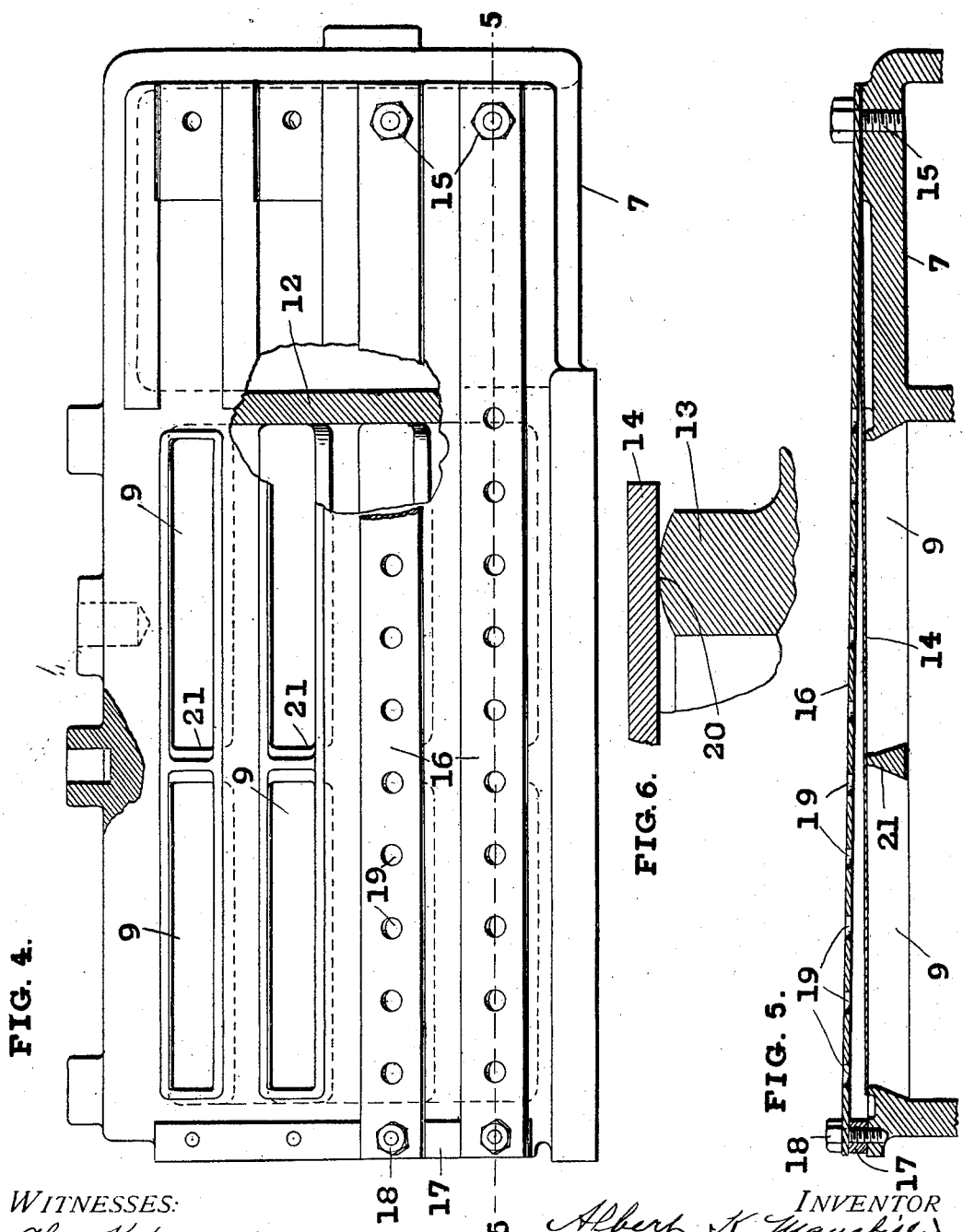

No. 756,868.

Patented April 12, 1904.

UNITED STATES PATENT OFFICE.

ALBERT K. MANSFIELD, OF SALEM, OHIO.

VALVE FOR BLOWING-ENGINES AND AIR-COMPRESSORS.

SPECIFICATION forming part of Letters Patent No. 756,868, dated April 12, 1904.

Application filed January 5, 1903. Serial No. 137,958. (No model.)

*To all whom it may concern:*

Be it known that I, ALBERT K. MANSFIELD, of Salem, Ohio, have invented a new and useful Improvement in Valves for Blowing-Engines and Air-Compressors, which invention is fully set forth in the following specification.

My invention relates to blowing-engines and air-compressors, and more particularly to the valve mechanism for controlling the inlet and outlet of air thereto and therefrom. In engines of this character it is very desirable that the parts or openings should be of ample size to permit the free and rapid entrance of the air to and its egress from the cylinder of the engine during the quick reciprocations of the piston in the cylinder. Moreover, in this, as in all other mechanical structures, minimum cost, cheapness, simplicity of construction and operation, durability and facility of assembling and disassembling for cleaning, inspection, and repairs are matters of much importance.

The object of the present invention is to provide a valve mechanism for blowing-engines and the like which shall comply with these conditions; and with this object in view the invention consists of the cylinder of such an engine having a plurality of inlet-ports leading from the external atmosphere to the cylinder and a plurality of ports leading from the cylinder to the conduit for conducting the air to the place of use or storage, which ports are controlled by flat blade-springs of elastic sheet metal secured at one end, while the other end is free to vibrate to open and close the ports, suitable stops being provided to limit the opening movements of the spring-blade. For the purpose of affording a large number of port-openings, both for the inlet and outlet of the air, I prefer to mount a series of inlet and outlet cages upon the cylinder-head, in the walls of which cages the ports are formed, the ported walls of the cages being prolonged or extended at one end beyond the ends of the ports and of the cage proper, so that they constitute ported valve-attaching frames on which valves controlling the ports are mounted.

There are other specific features of improvement which will be more fully hereinafter described and then defined in the claims.

In the accompanying drawings, which represent an embodiment of my inventive idea, Figure 1 is a side elevation of the cylinder of a blowing-engine with the inlet and outlet cages mounted thereon. Fig. 2 is an end elevation, partly in section, of the inlet-cage with the valves in position, and Fig. 3 is a like view of the outlet-cage. Fig. 4 is a broken side elevation of the outlet-cage with some of the parts removed. Fig. 5 is a longitudinal section on the line 5 5, Fig. 4, and Fig. 6 is a sectional detail showing the form of the valve-seat on an enlarged scale.

Referring to the drawings, in which like reference-numerals designate like parts throughout the several views, 1 is a cylinder of a blowing-engine, and 2 is an inlet-cage or superstructure mounted thereon and provided with a plurality of ports 3, here shown as eight in number, in free communication with the external atmosphere, while the cage is open at its bottom, as shown at 4, Fig. 2, and in direct communication with the interior of the cylinder 1. For convenience of construction this cage is preferably made in two longitudinal sections secured together by bolts 5, as shown in Figs. 1 and 2. Within the cage 2 is mounted a filler-block 6, designed to occupy a large portion of the space within the cage 2, for a purpose which will hereinafter be explained. This filler-block is preferably a casting conforming in general outline to the interior shape of the cage and is of such width as to leave ample space for the play of the valves and the passage of the air between its sides and the interior faces of the cage.

The outlet-cage 7, Fig. 3 and dotted lines, Fig. 1, is also mounted on the cylinder-head and in free communication with the interior of the cylinder through the bottom of the cage at 8, Fig. 3, and is provided with a plurality of ports 9. This outlet-cage 7 is preferably formed of a single casting and is inclosed or covered by a casing 10, closed to the external atmosphere, but open to a pipe or conduit 11, which serves to conduct the air from the blowing-engine to the point of use or storage. Instead of a filler-block such as is employed in connection with the inlet-cage 2 a transverse partition 12, Fig. 4, is preferably placed across the interior of the outlet-cage 7, thereby materially reducing the space within the cage which is in communication with the interior of the cylinder 1.

The ports 3 and 9 in the two cages are alike except that the valve-seats of the inlet-cage 2 are on the inside, whereas on the outlet-cage 7 they are on the outside, the ports in each case preferably flaring toward the direction from which the air comes when the blower is in operation. As clearly shown in Figs. 1, 4, and 5, the ports 2 and 9 are in the form of long narrow slots, surrounded by a raised lip or ridge 13, slightly convex on its upper surface to form a seat for the valve. These ports are formed in the side walls of the cage, which walls extend out beyond the ends of the ports and form valve-carrying frames or plates having the valves 14 attached thereto. The valves 14 for all the ports are exactly alike and consist of simple strips of elastic sheet metal secured at one end to the frame of the cage by a lug or bolt 15, Figs. 4 and 5, which bolt also passes through one end of a keeper or stop 16, which limits the play of the free end of the valve 14. As shown in Fig. 5, the bolt 15 serves to secure the valve 14 and the stop 16 tightly against the frame of the cage, while the opposite end of the valve is free to vibrate and the corresponding end of the stop 16 is raised a suitable distance above the valve by resting on a block 17, a bolt 18 passing through the stop and block and securing both to the frame of the cage. The particular valve shown in Fig. 5 is one mounted on the outside of the outlet-cage and opens outward. The construction of valves for the inlet-cage is the same as that shown in Fig. 5 and the mounting and operation are the same except that the valve is mounted on the inside and plays or opens inward against the stop or keeper. For the purpose of preventing any tendency of the valve to stick or cling to the stop by reason of air-pressure holding it against the stop openings or holes 19 are formed through the stop or keeper, as shown in Fig. 4, so that air may reach the top of the valve 14 through the holes or openings 19 and facilitate the ready separation of the valve from the stop or keeper as it starts on its closing movement.

The valve-seat is best shown in Figs. 5 and 6 and, as before stated, is in the form of a ridge or lip 13, whose bearing-surface 20 is convex, so that the valve bears upon the ridge at a tangent to the convex surface. By inspecting Figs. 4 and 5 it will be seen that the port is not shown as long as the valve. It might be of about the same length, but that portion adjoining the end where the valve is secured to the cage-frame would permit so little air to pass when the valve is fully open that the port is preferably made about the length shown. Moreover, a partition or bridge 21 is preferably employed about midway of the port's length, though this may be omitted, if desired.

By using the cages as shown I am enabled to form ports of such size as to be readily and completely controlled by valves of moderate size and yet secure a number of ports whose aggregate area is greater than I could obtain if the ports were formed in the cylinder-head itself, unless the latter were materially cut away for that purpose, and therefore greatly weakened. It will be readily understood, however, that the clearance-space in the cylinder above its piston is increased by the amount of the volume of these cages, and it is because it is desirable to reduce such clearance-space to a minimum that I have introduced the filler-block into the inlet-cage and the partition 12 into the outlet-cage for this purpose. The valves 14 and stops 16 are readily cut from sheet or bar metal. The cages are simple castings, and the parts are all quickly assembled and disassembled, so that inspection and repairs can be readily and quickly made.

Having thus described my invention, I claim—

1. The combination of an elongated elastic-metal valve-strip fixed at one end and free at the other, with a port bounded by a raised rib having a curved surface affording line-contact with the valve-strip, and a complemental stop or keeper substantially coincident with said valve-strip and fixed at both ends.

2. In a blower or compressor, the combination of an elongated elastic-metal valve-strip fixed at one end and free at the other, with a port bounded by a raised rib having a curved surface affording line-contact with said valve-strip.

3. In combination with an elastic-metal strip constituting a valve and its spring, the rounded contact-rib to produce approximate line-contact, and the keeper to restrict the movement of the valve.

4. In a valve for blowers and compressors, the combination of an elongated elastic-metal valve-strip fixed at one end and free at the other, a complemental stop or keeper substantially coincident therewith fixed at both ends, and fastening means common to both valve and stop at one end.

5. In a blower or compressor, a compartment provided with ports having valve-seats consisting of raised ribs having curved surfaces affording line-contact, in combination with elongated elastic-metal valve-strips covering the ports, stops substantially coincident with the valve-strips, fastening means common to a valve-strip and its complemental stop for attaching both fixedly at one end to the cage, and fastening means for the stop only, at the opposite end, whereby a line-contact with the valves and their seats is secured.

6. In a blower or compressor, a ported compartment, in combination with elongated elastic-metal valve-strips covering the ports, stops substantially coincident with the valve-strips, fastening means common to a valve-strip and its complemental stop for attaching both fixedly at one end to the cage, and fastening means for the stop only, at the opposite end.

7. A cage for a blower or compressor having a ported wall, and an extension of said wall beyond the limits of the cage, in combination with an elongated valve fixed at the outer end of said extension and covering the port in the wall.

8. A cage for a blower or compressor having ported walls, and an extension of said ported walls beyond the confines of the cage, in combination with elastic elongated valve-strips rigidly secured at the outer end of said extension and covering the ports in said walls.

9. A cage for blowers or compressors having ported converging walls, extensions of said ported converging walls continuing beyond the confines of the cage, in combination with elastic elongated valve-strips rigidly secured at the outer end of said extensions and covering the ports in the walls.

In testimony whereof I have signed this specification in the presence of two subscribing witnesses.

ALBERT K. MANSFIELD.

Witnesses:
ARTHUR M. TRACY,
HARRY E. STOVER.